Jan. 26, 1954  E. WEBER ET AL  2,667,622
COAXIAL CABLE ATTENUATOR MATCHING DEVICE
Filed March 6, 1945  2 Sheets-Sheet 1

Inventors
ERNST WEBER
JOHN W. E. GRIEMSMANN
STANLEY A. JOHNSON

By Ralph B. Stewart
Attorney

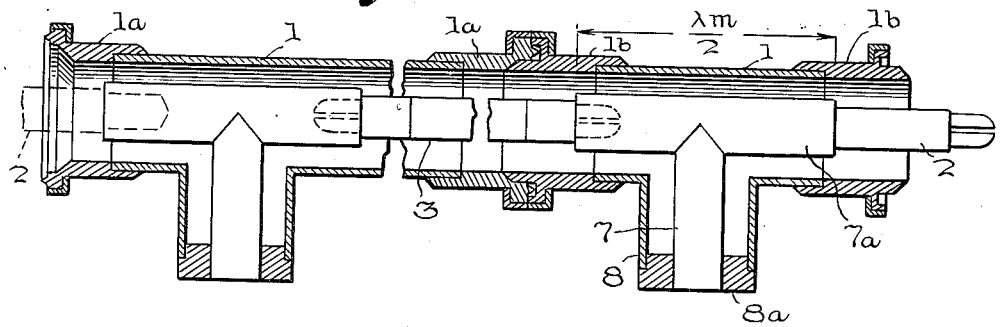
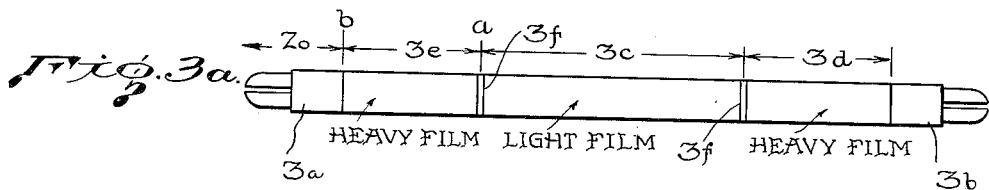
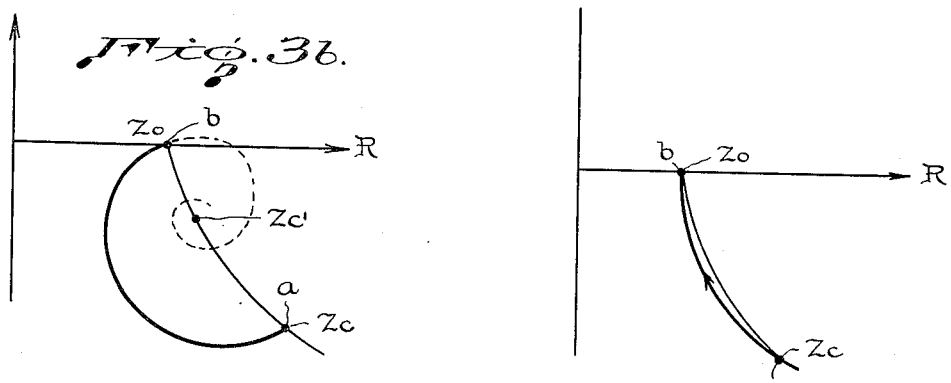
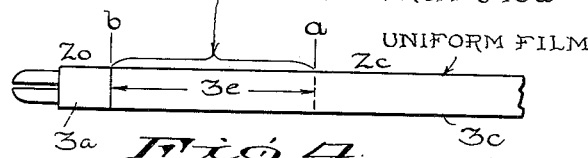
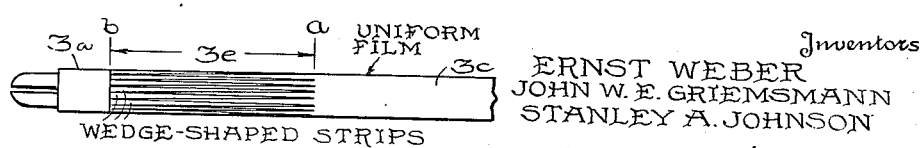

Patented Jan. 26, 1954

2,667,622

UNITED STATES PATENT OFFICE 2,667,622

COAXIAL CABLE ATTENUATOR MATCHING DEVICE

Ernst Weber, Mount Vernon, John W. E. Griemsmann, Bellaire, and Stanley A. Johnson, New York, N. Y., assignors to Polytechnic Institute of Brooklyn, Brooklyn, N. Y., a corporation of New York Application March 6, 1945, Serial No. 581,195

9 Claims. (Cl. 333—81)

This invention relates to matching devices for high frequency transmission lines, and especially for transmission lines used in the transmission of waves having frequencies of 300 megacycles and above.

Broadly, this invention is concerned with devices for preventing reflection losses in high frequency transmission lines at points where the impedance characteristic changes. The devices disclosed herein are especially useful for preventing reflection losses in coaxial cables, and one specific application of the invention is for preventing reflection losses by attenuators inserted in the cable.

In a co-pending application Serial No. 540,347, filed June 14, 1944, now Patent No. 2,529,436, there is described an attenuator structure for use in an ultra-high frequency concentric cable. This attenuator comprises broadly a thin metallic film deposited on an insulating tube or rod of substantially the same diameter as the inner conductor and inserted in the cable as a linear section of the inner conductor. Due to the fact that the section of the cable containing the metal film has a different characteristic impedance from that of the adjacent sections, the attenuator unit will cause undesirable reflection of the waves in the cable at the junction.

One object of the present invention is to devise arrangements for preventing reflections as described above.

A further object is to devise broad band matching devices by which the input impedance of the attenuator unit, or other device being compensated, will remain close to the characteristic impedance of the transmission line or cable over a considerable range of frequency.

The matching devices are formed of loss producing elements and may be embodied in the attenuator unit itself in the form of compensating sections as described below at one or both ends of the attenuator unit, or they may be formed as separate elements embodied in the transmission lines at points spaced from the attenuator unit, or they may be embodied in arrangements where the cross-sectional area of the inner conductor is varied from its normal area to cancel reflection from the attenuator unit.

Another object of the invention is to devise unitary assemblies embodying both an attenuator unit and the necessary compensating or matching devices to cancel reflection by the attenuator unit, the assembly being designed as a unit which may be quickly and easily inserted as a section in a coaxial cable.

While the matching devices described herein are applied to prevent undesirable reflection losses from the front end of attenuators, it will be understood that they may be used generally to prevent reflection losses by any other element causing a discontinuity in the impedance characteristic of the transmission line.

Various physical embodiments of our invention are illustrated in the accompanying drawings in which Figure 1 illustrates an arrangement involving the use of a shunt type of matching element;

Figure 3 is a longitudinal sectional view of an attenuator assembly showing known stub supports for the center conductor including the attenuator unit;

Figure 3a shows the preferred form of attenuator unit in which the matching elements are formed as end sections of the attenuator unit;

Figure 3b is a circle diagram for the attenuator unit of Figure 3a;

Figure 4 illustrates an attenuator unit involving a series matching element having a broad-band characteristic;

Figure 4a is a circle diagram for Figure 4; and

Figure 5 is a showing of another broad-band matching arrangement involving a series element.

Figure 1:
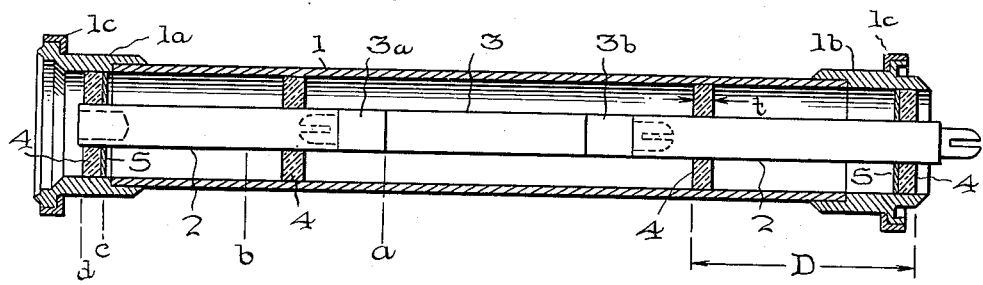
Figure 1a is a circle diagram for Figure 1.
Figure 1b is an end view of Figure 1.
Figure 1A:
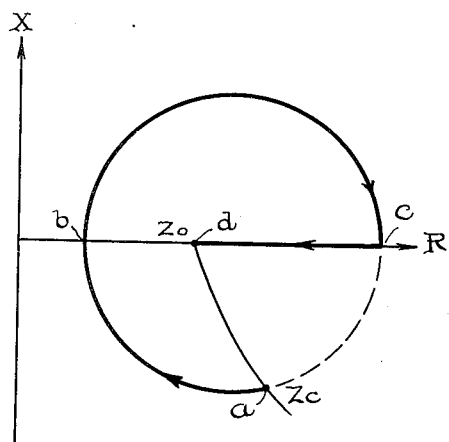
Figure 1B:
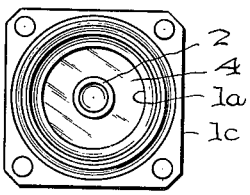

Referring to the drawing, Figure 1 shows a longitudinal sectional view of an attenuator assembly which may be embodied in a coaxial transmission line. The inner conductor with the attenuator unit is shown in elevation, while the outer conductor with the coupling elements is shown in longitudinal section. In the drawing, 1 indicates the outer conductor of the coaxial cable which also forms the outer casing of the attenuator assembly. A coupling element 1a is provided at one end of the attenuator assembly and has a conical shaped socket in the outer end thereof for receiving the conical shaped end of a plug type coupling unit which would be carried by the section of cable to be coupled to the left end of the attenuator unit. The other end of the attenuator assembly is provided with a plug type of coupling element 1b having a conical shaped plug at the outer end thereof which would engage a socket type of plug (like that shown at 1a) carried by the cable or device to be coupled to the right end of the assembly. Each coupling element is provided with a clamping ring 1c which preferably is formed of a square plate as shown in Figure 1b and is provided with holes at each corner for receiving clamping screws or bolts whereby two complemental coupling elements may be clamped together. It will be understood that each clamping ring is provided with a circular socket for receiving a radial circular flange formed on each of coupling elements 1a and 1b. Other types of coupling elements may be employed than those illustrated.

The inner conductor is shown at 2 and the attenuator unit inserted as a section in the inner conductor is shown at 3. The preferred form of the attenuator unit comprises a thin metal film deposited on a dielectric carrier of substantially the same diameter as the inner conductor 2 and is described in more detail in the copending application referred to above. Briefly, the attenuator unit is formed of a glass tube of substantially the same outside diameter as the inner conductor 2 and is provided with metal terminal pieces 3a and 3b at the ends thereof, each comprising a "bullet" type of connector for insertion in the adjacent ends of conductor 2 as shown in Figure 1. The glass tube is coated with a thin metal film which has contact with terminals 3a and 3b either directly or through terminal collars, as explained more fully in application Serial No. 540,347. The sections of the inner conductor 2 arranged at opposite ends of the attenuator unit 3 are supported at the center of the outer conductor 1 by suitable insulating beads or discs 4, although other means of support may be employed as will appear hereinafter. For the purpose of cancelling reflection of waves from the attenuator unit 3, one of the discs 4 is provided with a conductor layer 5 on one face thereof (or on both faces), the film preferably having contact with both conductors of the cable. In order to make the attenuator useful for transmission in both directions, a similar matching film is provided on a similar disc symmetrically arranged at the opposite end of the attenuator unit. The location of each matching film and its impedance value will be determined in accordance with the considerations brought out in the following discussion.

Assume that the attenuator assembly is connected in a coaxial cable, and the transmission is form left to right in Figure 1. If the transmission line has a known characteristic impedance, Zo, then the input impedance of the attenuator should have a value as close as possible to Zo in order to avoid reflection at the input end of the attenuator. Similarly, the output impedance of the attenuator should have a value close to the characteristic impedance of the succeeding transmission line in order to avoid power reflection at the output end of the attenuator. The succeeding line can, of course, have a characteristic impedance different from Zo in the general case.

In the particular case of metallic film attenuators, which themselves represent sections of a transmission line with a characteristic impedance of their own, namely Zc, matching is obtained by providing transition sections such that the input impedance, Zi, of the attenuator film combined with the impedance of the transition section results in the characteristic impedance, Zo, of the transmission line into which the attenuator is inserted. In practical cases, the transmission line itself is practically lossless and has a characteristic impedance which is very close to a real resistance, whereas the characteristic impedance of a metallic film attenuator unit has a frequency-dependent, reactive component.

By the use of circle diagrams, the impedance of a transmission line at any point along its length can be found as a point in a complex plane with resistance R, as abscissa, and reactance $jX$, as ordinates. The metallic transmission line with negligible losses will, therefore, always correspond to points along the real axis, whereas the film attenuator unit will appear as $Zc = R + jX$, with usually a negative reactive component $(X < 0)$.

Referring to Figure 1, the point $a$ indicates the point where the attenuating film joins the low resistance part of the inner conductor of the cable and therefore is the point of impedance discontinuity. It will be understood that point $a$ has an input impedance equal to the characteristic impedance of the metal film section and this presupposes an attenuator unit infinitely long or at least long enough so that reflections from the subsequent system or load have no effect upon the input impedance of the attenuator film itself. This assumption is employed in all cases where the spiral or circle diagram starts from Zc, which is defined as the characteristic impedance of the metal film section. The point $b$ indicates the first position of minimum input impedance as measured to the left of point $a$. Point $c$ indicates the position of the matching film 5, and point $d$ marks the outer end of the matching section of the attenuator assembly. The matching film 5 must have a real resistance such that its parallel combination with the real impedance of the line at voltage maximum results in a resistance equal to Zo, the characteristic impedance of the line, and must, therefore, be located at the first maximum for the input impedance of the line produced by the discontinuity at the point $a$, where the high resistance attenuating film joins the low resistance section of the center conductor. The impedance diagram for the arrangement shown in Figure 1 is illustrated in Figure 1a. From this diagram it will be seen that starting from the point $a$ corresponding to an impedance of Zc, the characteristic impedance of the attenuator film, the impedance of the cable as measured along points to the left of the point $a$ will vary according to the circle diagram passing through the point $b$, where the impedance of the line becomes a minimum, and continuing to the point $c$ where the impedance of the line is a maximum. At this point, the shunt matching film 5 brings the impedance value back to Zo, the characteristic impedance of the lossless transmission line. (In Figure 1a the effect of the supporting bead 4 is disregarded.) Accordingly, as seen from the left of Figure 1, the transmission line is now apparently terminated at the point $d$ into a total impedance Zo and, therefore, no reflection will take place at this point. In this form of matching, there will be a certain power loss in the matching film 5, and any standing waves due to reflection from the point $a$ will be confined to the line section between points $a$ and $c$.

With the shunt matching element of Figure 1, the transmission line is matched exactly only for one given wave length, and for other wave lengths the point of maximum impedance will not correspond to the position of the film 5. Accordingly, the "shunt matching" as described above for Figure 1 is frequency sensitive because the matching film 5 must be located at the first maximum of the input impedance, tracing back from point $a$. If the wave length changes, the position of that maximum will obviously shift, and the disc will be incorrectly placed. By manual adjustment of the position of the matching disc it is possible to keep matching accurate over varying wave lengths.

The insulating beads or discs 4 employed to support the inner conductor will cause wave reflection unless measures are taken to prevent it. By arranging these beads in pairs and properly spacing the two beads of each pair, the reflection from one bead will cancel the reflection from the other bead of the pair. For this purpose, the distance D shown in Figure 1 representing the distance between the outer faces of the two beads in a pair should be one fourth of the sum of the wave length being transmitted plus one thickness of a supporting bead. In other words $$D = \frac{\lambda + t}{4}$$

Figure 2A:
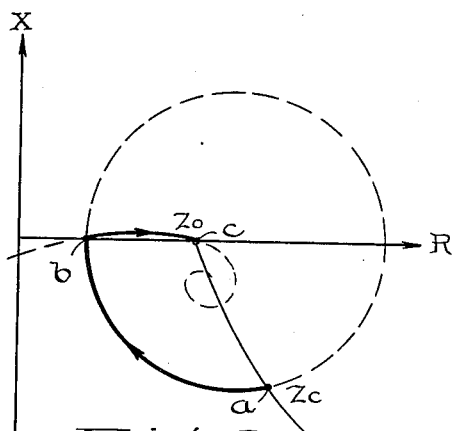
Figure 2a is a circle diagram for Figure 2.
Figure 2:
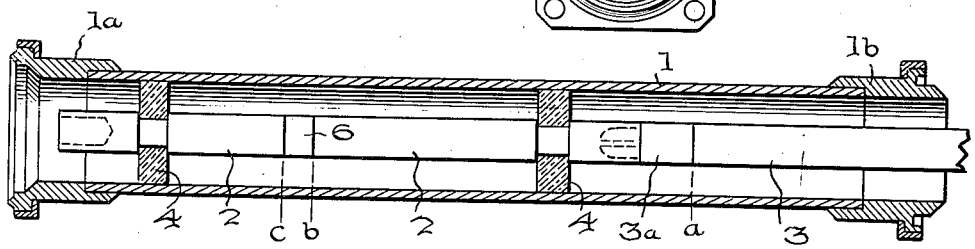
Figure 2 illustrates an arrangement involving a series type of matching element.

Figure 2 illustrates an arrangement involving "series matching." This figure is a longitudinal sectional view showing the left half of an attenuator assembly, except that the inner conductor and the attenuator unit are shown in elevation. Elements which correspond to similar elements in Figure 1 are represented by like reference characters. In this arrangement the construction of the right half of the attenuator assembly is symmetrical with respect to the left half illustrated in Figure 2, and the two halves are joined together by suitable coupling elements like those illustrated at 1a and 1b. This construction permits easy removal of the attenuator unit for the substitution of another unit having a different characteristic. The same coupling arrangement may be used in Figure 1 to permit easy replacement of attenuator units.

In Figure 2, the center conductor 2 is supported by beads 4, and the attenuator unit 3 is mounted to form a linear section of the center conductor. For the purpose of compensating for wave reflection from the point $a$ where the attenuator film joins the low resistance section of the inner conductor, a relatively short section (short compared with the wave length of transmission) of the inner conductor shown at 6 is formed of relatively high resistance and has a value which combined with the input impedance of the line is equal to $Z_0$, the characteristic impedance of the line. This matching section is inserted in the inner conductor at the first point of voltage minimum traced back from the point $a$.

Figure 2a shows the impedance diagram for the arrangement of Figure 2. Starting from the point $a$ with an impedance of $Z_c$, the impedance of the line follows the circle to the minimum impedance point $b$, and then the matching element 6 causes the impedance curve to follow along a spiral arc to the point $c$ having an impedance of $Z_0$, thus matching the impedance of the transmission line.

Figure 2 illustrates a different method preventing reflection from the beads 4. In this arrangement, the inner conductor 2 is provided with a reduced diameter at the points where the beads 4 engage the conductor, the diameter is reduced to a value such that the effective impedance of the supporting bead and the reduced section of conductor 2 is equal to $Z_0$, the characteristic impedance of the line. In this case the spacing between adjacent beads is not important.

Figure 3 is a longitudinal sectional view of an attenuator assembly illustrating another construction for supporting the inner conductor, and also illustrating the two halves of the attenuator casing joined together at the middle by complemental coupling elements 1a and 1b previously described. In this arrangement, the adjacent sections of the inner conductor are supported by two T-shaped supports arranged in opposite halves of the attenuator assembly, and the attenuator unit 3 is supported between these T-shaped supports. As shown in the right half of Figure 3, each T-shaped support comprises a stem portion 7 which is supported in a lateral stub extension 8 of casing 1, and a head portion 7a arranged coaxially with inner conductor 2 at the center of the outer conductor 1. The stem 7 is supported concentrically with stub 8 by means of a plug 8a closing the outer end of the stub. The effective length of the stem 7 is ¼ of the mid band wave length to be transmitted. The head portion 7a of the T-support has a length equal to ½ the mid-band wave length.

By forming the head piece 7a of a larger diameter than the center conductor 2 and larger than the attenuator unit 3, this head piece forms a transformer unit which prevents reflection from the support over an appreciable band of wave lengths.

It will be understood that the T-shaped support as shown in Figure 3 may be employed generally for supporting the inner conductor of the coaxial cable or in any of the attenuator assemblies described herein.

Figure 3a shows the preferred form of attenuator unit which also embodies matching or compensating sections to prevent wave reflection. This unit is constructed generally in the same manner as the attenuator unit described in the copending application referred to above except in the following respects. The tubular support for the attenuator unit is made longer than is necessary to secure the desired attenuator resistance for a given thickness of film. The entire length of the tube is then coated with a thin metallic film of proper thickness so that the resistance of the central portion 3c is somewhat less than the desired resistance to be incorporated in an attenuator unit. The central portion 3c is then covered with suitable protecting material, such as tape, and the end portions 3d and 3e are coated to a greater thickness of film than the central portion. The films on the different sections may be formed independently if desired. A narrow collar or ring 3f formed of a low resistance film is applied at the boundary between the main attenuator section 3c and the end sections 3e and 3d. These collars have a much lower resistance than the compensating sections and serve to give a definite boundary between the different sections of the attenuator unit. Also, where the various sections are formed separately, these collars serve to connect the adjacent sections and will eliminate any variation or irregularity in the joint between sections.

The thickness of the film on the end sections and the length of these end sections will depend upon the wave length to be transmitted, the characteristic impedance of the line, and the characteristic impedance of the mid-section of the attenuator unit. The compensating film sections should provide an input impedance at the input end of the attenuator unit equal to, or close to, the characteristic impedance of the transmission line or cable.

The impedance characteristic of the attenuator unit shown in Figure 3a is illustrated in Figure 3b. This diagram shows that starting at the point $a$ with an impedance $Zc$, the characteristic impedance of the attenuator film $3c$, the impedance changes according to a spiral curve circling about the point $Zc'$, the characteristic impedance of the compensating film. This impedance is chosen to have a value such that the spiral curve passes through the point $Zo$ which corresponds to the impedance at the point $b$. The compensating section is then made of a length such that it will provide an input impedance equal to $Zo$. With this arrangement, the metallic line at the point $b$ appears to be terminated into an impedance $Zo$ and there will be no reflection. For practical reasons the match will seldom be perfect, but frequently very closely so. In practical cases, the matching is satisfactory if the standing wave ratio measured at the front end of the attenuator is below a certain critical value, as 1.02 for excellent matching, 1.05 for very good matching, 1.1 for good matching and 1.2 for fair matching.

The spiral curve centered on the point $Zc'$ of Figure $3b$ is of the well known type represented by the formula:

$$\frac{Zc}{Z_0} = \delta + j\sigma = \sqrt{1 - j\left(\frac{r\lambda}{2\pi Z_0}\right)}$$

where $\delta$ is the normalized resistance and $j\sigma$ is the normalized reactance. This formula is derived from the well known formula:

$$Z_c = \sqrt{\frac{r + j\omega l}{g + j\omega C}}$$

where $r$ is the resistance per unit length, $l$ is the inductance per unit length, $g$ is the conductance per unit length, $C$ is the capacity per unit length and $\omega (=2\pi f)$ is the angular frequency or velocity.

The curvature of the characteristic impedance curve passing through the points $Zo$, $Zc'$, and $Zc$ represents conditions for high attenuation in which the resistance per unit length of the attenuator section constitutes a substantial component of the series impedance per unit length. For proper matching under such conditions, the point $Zc'$ will always be located at a point such that its reactive component is substantially less than one-half the value of the reactive component of the point $Zc$. In other words, the attenuator section of the unit will have a characteristic impedance such that its reactive component is substantially more than twice the value of the reactive component of the characteristic impedance of the compensating or matching section.

The attenuator unit shown in Figure $3a$ provides fairly broad band matching and gives very good results for frequency changes up to 15 per cent on either side of the design frequency.

For very broad band matching, an attenuator unit like that illustrated in Figure 4 may be employed. This unit is constructed in the same general manner as the unit of Figure $3a$ except that, instead of forming the compensating section of a film of uniform thickness, the film is made of varying thickness to provide a gradual change in resistance from the point $a$ to the point $b$. The compensating film changes continuously from a thickness at the point $a$ equal to the same thickness as the film in the attenuator section $3c$ to the relatively thick film at the point $b$. As in the case of Figure $3a$, the films may be applied either by the thermal evaporation process or by applying coatings of metal solutions which are then baked.

Figure $4a$ shows the impedance diagram for the attenuator of Figure 4 where the matching section changes in resistance continuously from the point $a$ to the point $b$. Starting at the point $a$ where the characteristic impedance of the attenuator section $3c$ is $Zc$, the impedance at points to the left of the point $a$ in Figure 4 will follow the curved line in Figure $4a$ down to the point $b$ on the R axis where the effective input impedance of the attenuator unit is $Zo$, corresponding to the characteristic impedance of the transmission line or cable. The exact shape of the curve $a$ to $b$ depends, of course, on the actual variation of the resistance, which can be made either linear or exponential or in any suitable and practicable form, so that the input impedance of the system going from $a$ to $b$ converges upon $Zo$.

Figure 5 illustrates another construction of attenuator unit for very broad band matching. This arrangement differs from Figure 4 in that, instead of forming the matching section of a uniform film of varying thickness, the resistance of the section is varied from the point $a$ to the point $b$ by providing a plurality of wedge shaped film strips of nearly uniform thickness on the surface of the section with the base portions of the strips located at the point $b$. It will be understood that these wedge shaped strips are applied on top of a thin conductive film which constitutes an extension of the attenuator section $3c$. The impedance diagram for Figure 5 is practically the same as that for Figure 4 and is therefore quite similar to that shown in Figure $4a$.

In each of Figures $3a$, 4 and 5, the matching films in the sections $3e$ and $3d$ all have a lower resistance value per unit length of the attenuator than the attenuating film in section $3c$.

We claim:

1. An attenuator for a coaxial cable comprising an attenuator section formed of a section of coaxial cable having a resistive center conductor in which the resistance per unit length constitutes a substantial component of the series impedance per unit length of the attenuator section, and matching means comprising a section of coaxial cable located in front of said attenuator section and having a resistive inner conductor, said matching section having a lower characteristic impedance than said attenuator section and having a reactive component considerably less than one-half the reactive component of the characteristic impedance of the attenuator section, and said matching section being of a length such that the characteristic impedance of said cable at the input end of said matching section is equal to the normal characteristic impedance of said cable.

2. In a coaxial cable having an impedance discontinuity located at a point along its length, a broad-band matching device for cancelling reflection from said discontinuity comprising a loss-producing linear section of the center conductor of said cable spaced from said point of discontinuity and located at the first point of minimum voltage in front of said point of discontinuity and having an impedance characteristic such that the input impedance of said matching device is equal to the characteristic impedance of the cable.

3. In combination, a coaxial cable, an attenuator unit comprising a resistive section of the center conductor of said cable and forming a discontinuity in the impedance of said cable, and matching means comprising a loss producing element embodied in said cable in front of said attenuator unit and having an impedance such that the combined effective impedance of said matching means and said attenuator unit corresponds to the characteristic impedance of said cable, said matching means comprising a shunt element connected across the conductors of said cable and being located at the first point of maximum impedance of said cable in front of said attenuator unit.

4. An attenuator unit for use in a coaxial cable comprising, a dielectric carrier having an outside diameter substantially equal to the outside diameter of the inner conductor of said cable and having low resistance terminal elements provided at each end thereof, a thin metallic attenuating film covering a central section of said carrier, matching films provided on sections interposed between said attenuator film and said terminal elements and having a lower resistance value per unit length of the carrier than that of said attenuating film, and low-resistance collars formed around said carrier at the ends of said attenuating film, said collars being bonded to both of said films throughout their peripheral extent and thereby forming low-resistance junctions between said matching films and said attenuating film.

5. An attenuator unit for use in a coaxial cable comprising, a dielectric carrier having an outside diameter substantially equal to the outside diameter of the inner conductor of said cable and having a low resistance terminal element at one end thereof, a thin metallic attenuating film covering a linear section of said carrier spaced from said terminal element, a matching film arranged on the section of said carrier between said attenuator film and said terminal element and having a lower resistance value per unit length of the carrier than that of said attenuating film, and a low-resistance ring of relatively narrow width formed around said carrier between said attenuator film and said matching film, said ring being bonded to both of said films throughout its peripheral extent and thereby forming a low-resistance junction between said attenuator and matching films.

6. An attenuator assembly for use in a coaxial cable comprising, in combination, a cylindrical casing having substantially the same inside diameter as the outer conductor of said cable, said casing being divided into two linear sections and including detachable coupling elements for joining said sections, an attenuator unit mounted within said casing at the center thereof and having substantiailly the same outside diameter as the inner conductor of said cable, said attenuator unit being detachably supported between a pair of quarter-wave stub supports mounted on said casing sections, and detachable coupling means at each end of said casing and said attenuator unit for connecting said casing and said stub support to the outer and inner conductors respectively of said cable.

7. An attenuator assembly for use in a coaxial cable comprising, in combination, a cylindrical casing having two linear sections detachably coupled together and being of the same inside diameter as the outer conductor of said cable, means for supporting a section of inner conductor within each section of said casing with adjacent ends thereof arranged in spaced relation, and means for detachably supporting an attenuator unit between said adjacent ends of said center conductor sections.

8. An attenuator unit for use in a coaxial cable comprising, a dielectric carrier having an outside diameter substantially equal to the outside diameter of the inner conductor of said cable and having a low resistance terminal element at one end thereof, a thin metallic attenuating film covering a linear section of said carrier spaced from said terminal element, a matching film arranged on the section of said carrier between said attenuator film and said terminal element, said matching film has a resistance per unit length of the carrier which varies smoothly from a low value at said terminal element to a value approximately equal to the resistance of said attenuator film at the point of juncture with said attenuator film.

9. An attenuator unit for use in a coaxial cable comprising, a dielectric carrier having an outside diameter substantially equal to the outside diameter of the inner conductor of said cable and having a low resistance terminal element at one end thereof, a thin metallic attenuating film covering a linear section of said carrier spaced from said terminal element, a matching film arranged on the section of said carrier between said attenuator film and said terminal element, said matching film comprises a plurality of wedge shaped conductive elements arranged in parallel relation on said matching section with the base ends thereof connected to said terminal element.

ERNST WEBER.
JOHN W. E. GRIEMSMANN.
STANLEY A. JOHNSON.

References Cited in the file of this patent

UNITED STATES PATENTS

| Number | Name | Date |
|---|---|---|
| 1,063,396 | Seibt | June 3, 1913 |
| 1,957,538 | Jensen | May 8, 1934 |
| 2,030,178 | Potter | Feb. 11, 1936 |
| 2,060,042 | Cowan | Nov. 10, 1936 |
| 2,148,453 | Fruth | Feb. 28, 1939 |
| 2,165,961 | Cork et al. | July 11, 1939 |
| 2,262,020 | Llewellyn | Nov. 11, 1941 |
| 2,262,134 | Brown | Nov. 11, 1941 |
| 2,270,949 | Hulster | Jan. 27, 1942 |
| 2,409,599 | Tiley | Oct. 15, 1946 |
| 2,410,706 | Bradley | Nov. 5, 1946 |
| 2,425,345 | Ring | Aug. 12, 1947 |
| 2,597,867 | Hansen | May 27, 1952 |

FOREIGN PATENTS

| Number | Country | Date |
|---|---|---|
| 432,040 | Great Britain | July 19, 1935 |